US012753815B2

(12) United States Patent

Shahin

(10) Patent No.: US 12,753,815 B2
(45) Date of Patent: Oct. 6, 2026

(54) BRAKE DISK WITH AN INTERLAYER HAVING A SHAPE ELASTICITY

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Pyeongtaek-si (KR)

(*) Notice: Subject to any disclaimer, the term of this patent is extended or adjusted under 35 U.S.C. 154(b) by 437 days.

(21) Appl. No.: 18/376,140

(22) Filed: Oct. 3, 2023

(65) Prior Publication Data

US 2024/0183416 A1 Jun. 6, 2024

(30) Foreign Application Priority Data

Dec. 5, 2022 (DE) ..................... 10 2022 213 084.7

(51) Int. Cl.
*F16D 65/12* (2006.01)
*F16D 65/02* (2006.01)

(52) U.S. Cl.
CPC ...... *F16D 65/125* (2013.01); *F16D 2065/132* (2013.01)

(58) Field of Classification Search
None
See application file for complete search history.

(56) References Cited

U.S. PATENT DOCUMENTS 2,243,334 A * 5/1941 Eksergian ............. F16D 65/123 324/121 R
3,231,058 A 1/1966 Batchelor et al.
3,983,973 A * 10/1976 Zboralski ................. B61H 5/00 188/264 A
2006/0076200 A1* 4/2006 Dessouki ............ F16D 65/0018 188/218 XL
2015/0267765 A1* 9/2015 Kim ........................ F16D 13/72 192/113.21

FOREIGN PATENT DOCUMENTS

DE 692 00 762 T2 5/1995
DE 10 2009 027 116 A1 12/2010
DE 10 2010 060 197 A1 5/2012
DE 10 2018 108 350 A1 10/2018
DE 102017120991 A1 * 3/2019 ............. F16D 13/64
GB 1230274 A * 4/1971 ......... F16D 65/0006
GB 1251039 A * 10/1971 ........... F16D 65/125
GB 2553835 A 3/2018

OTHER PUBLICATIONS

DE-102017120991-A1: English Machine Translation (Year: 2019).*

* cited by examiner

*Primary Examiner* — Melanie Torres Williams
(74) *Attorney, Agent, or Firm* — Hauptman Ham, LLP

(57) ABSTRACT

The invention relates to a brake disk for a disk brake system, comprising a first friction ring for engagement with a first brake pad, a second friction ring for engagement with a second brake pad opposite to the first brake pad, and an interlayer interposed between the first friction ring and the second friction ring, the interlayer having a shape elasticity and being configured to be compressed in an axial direction during application of brake pressure by way of the brake pads. The invention also relates to a disk brake system and use of a disk brake system.

13 Claims, 32 Drawing Sheets

BRAKE DISK WITH AN INTERLAYER HAVING A SHAPE ELASTICITY

CROSS-REFERENCE TO RELATED APPLICATION

This application is based on and claims priority under 35 U.S.C. § 119 to German Patent Application No. 102022213084.7, filed on Dec. 5, 2022 in the German Patent and Trade Mark Office, the disclosures of which are incorporated herein by reference.

TECHNICAL FIELD

The invention is in the field of mechanical engineering, in particular vehicle technology. It relates to a brake disk for a disk brake system, and to a disk brake system. The invention may advantageously be used in a vehicle, such as a car or a truck.

BACKGROUND

A brake disc is generally used as a friction member of a disc brake assembly of a vehicle. A typical disc brake assembly includes a pair of brake pads disposed on either side of the brake disc and further includes means for pressing the brake pads against friction surfaces on either side of the brake disc. When the vehicle moves, the brake disc rotates jointly with the wheel on which the brake disc is mounted. To reduce the speed of the vehicle, the driver can apply the disc brake. As the disc brake is applied, the brake pads are pressed against the brake disc which creates friction between the stationary brake pads and the rotating brake disc and converts kinetic energy of the vehicle into heat and slowing down the vehicle.

SUMMARY

It is an object of the invention to reduce drag torque. This may help to reduce fuel consumption, wear, brake dust and undesired noise. Drag torque occurs when the brake pads do not reliably resume and/or maintain their desired distanced position from the brake disk. According to the state of the art, retraction springs are supposed to help reduce drag torque. The present invention aims for a solution to reduce drag torque, while additional components such as retraction springs, which may be expensive, heavy, and error-prone, may be avoided.

The above-defined objective is achieved by a brake disk according to claim 1. Advantageous embodiments can be found in the dependent claims and in the following description and the figures.

Accordingly, a brake disk for a disk brake system comprises a first friction ring for engagement with a first brake pad, a second friction ring for engagement with a second brake pad opposite to the first brake pad, and an interlayer interposed between the first friction ring and the second friction ring. The interlayer has a shape elasticity and is configured to be compressed in an axial direction during application of brake pressure by way of the brake pads.

The brake disk is for example a brake disk for a car or truck. It may for example be used in caliper disk brake systems of a car or a truck, for example with a fixed caliper or with a floating caliper.

The interlayer of the brake disk has an axial elasticity, as mentioned above, enabling axial compression during application of the brake pads. This axial compression, from an initial non-compressed state to a compressed state, takes place as the brake pads are applied to the opposing sides of the brake disk, against a restoring elastic force of the interlayer. This restoring elastic force of the interlayer effects an outward movement of at least one of the friction rings, towards the respective brake pad, as the interlayer resumes the non-compressed state. The restoring force acts like a spring that exerts an outward push or thrust on at least one of the brake pads. The expanding brake disk may thus deliver an impact effect on the brake pads. The solution according to the invention thus helps to push or thrust the brake pads away from the surface of the friction ring at which they engage, pushing or thrusting the brake pads as long as they are in contact with the brake disk, or while there is a very small gap or air cushion of for instance 0.02 mm to 0.05 mm between the brake pad and the brake disk surface, forcing the brake pads back to their desired non-braking state at a distance of for instance about 0.1 mm or more from the brake disk.

Elasticity of the interlayer includes a shape elasticity. This shape elasticity may be tuned to the needs of the application. This is done by choosing the dimensions and geometries of the disk components and of the holes or recesses, to achieve the desired amount of compressibility.

The shape elasticity may for instance be provided by way of at least one hole or recess in the interlayer. The holes or recesses may be designed to enable and limit deformation of the interlayer.

In the brake disk, a linear elastic behavior of the interlayer may advantageously achieved over a wide range of pressure values.

A width of the at least one hole or recess in the axial direction may for instance be at least 3 mm and/or at most 5 mm. This width may for instance be measured in the relaxed non-compressed state of the interlayer. The width may for instance be measured at the widest point of the hole or recess.

A thickness of each of the friction rings in the axial direction may for instance be at least 4 mm and/or at most 8 mm. A thickness of the interlayer in the axial direction may for instance be at least 7 mm and/or at most 15 mm.

For example, the at least one home may have an elongate shape. For example, the interlayer may comprise at least one hole or recess extending circumferentially at least along a part of a circumference of the brake disk. Additionally or alternatively, the interlayer may comprise at least one hole extending radially. Radially extending holes may extend at least along a portion of a width of the interlayer, the width of the interlayer being measured from a circumferentially inner edge to a circumferentially outer edge of the interlayer.

In an example, the interlayer comprises at least two or at least three holes extending concentrically circumferentially at least along a part of a circumference of the brake disk.

For example, the interlayer may comprise at least one hole or recess that is connected to a circumferentially inner edge and/or a circumferentially outer edge of the interlayer. By way of this, elasticity can be further influenced. Moreover, manufacturing can be facilitated. Moreover, cooling of the brake disk can be achieved. It may also be envisioned to provide the holes in addition to further cooling features, such as holes or channels etc.

For example, the interlayer may comprise one or more holes or recesses that are spherical, cube-shaped, or cuboid-shaped.

For example, the interlayer may comprise at least one hole having a cross section that is elliptical or almond-shaped or drop-shaped or rectangular. The cross-section may for instance be considered in a cut plane spanned by a vector along the axial direction and a vector along the radial direction and/or in a cut plane orthogonal to the axial direction.

In different embodiments, the holes or recesses may be arranged within the same plane that is orthogonal to the axial direction, or out-of-plane with regard to each other.

The interlayer may for instance be connected to a hub of the brake disk. This may allow movement of both friction rings in the axial direction during compression and expansion of the interlayer. In another example, one of the first friction ring and the second friction ring may be connected to the hub of the brake disk, allowing movement of the remaining friction ring with respect to it.

An inward movement of at least one of the friction rings, toward a center (which typically runs through the interlayer) of the brake disk, is envisioned and thus enabled when the brake pads press against the brake disk. The inward movement is followed by an outward movement of the respective at least one of the friction rings, away from the center of the brake disk. In each case, movement is typically along the axial direction. Movement of the friction rings may be symmetrical or may be different for an outer brake pad and an inner brake pad.

The hub may for instance be made of aluminum, phenolic material or another light weighted material.

The interlayer and the first friction ring and the second friction ring may be formed by separate parts that have been joined together.

The interlayer may be made from a different material than the first friction ring and the second friction ring. For example, the interlayer may be made from a material with a higher elasticity (lower E-Modulus) and/or lower brittleness.

The interlayer may comprise or consists of steel and/or grey cast iron and/or aluminum.

The first friction ring and the second friction ring may comprise or consist of grey cast iron and/or ceramics.

The interlayer may be configured to be compressed by at most 0.25 mm or at most 0.2 mm or at most 0.15 mm or at most 0.1 mm. For example, the holes or recesses may be designed to enable a maximum deformation of any of these exemplary amounts. For example, a stop can be provided between the friction rings or within the interlayer.

For example, the interlayer may be configured to be compressed by at least 0.1 mm or at least 0.15 mm or at least 0.2 mm at a brake pressure of 70 bars. For instance it may be envisioned that the interlayer is compressed by 0.2 mm at a pressure of 70 bars, wherein the compression of 0.2 mm may be defined as a maximum compression by way of structural features of the brake disk, in particular by way of design of the interlayer, such as the holes or recesses in the interlayer.

For example, to compensate for additional brake fluid absorption, it may be envisioned to increase a compressibility of an underlayer, friction material and/or adhesives in the brake pads. Additionally or alternatively, materials, in particular metals, with high thermal expansion may be used as materials of the disc, to increase axial thermal expansion of the disk.

The application discloses a disk brake system, comprising a brake disk according to any of the embodiments shown herein, and a first brake pad for pressing against the first friction ring, and a second brake pad for pressing against the second friction ring.

The application also discloses a use of this disk brake system, wherein brake pressure is applied by pressing the first brake pad against the first friction ring and the second brake pad against the second friction ring, thus compressing the interlayer. When the brake pressure is subsequently released, a restoring elastic force of the interlayer effects an outward movement of at least one of the first friction ring and the second ring against the respective brake pad, pushing the respective brake pad outward.

BRIEF DESCRIPTION OF DRAWINGS

The invention will now be exemplarily explained with reference to the appended figures.

In the Figures.

DETAILED DESCRIPTION

Figure 1:
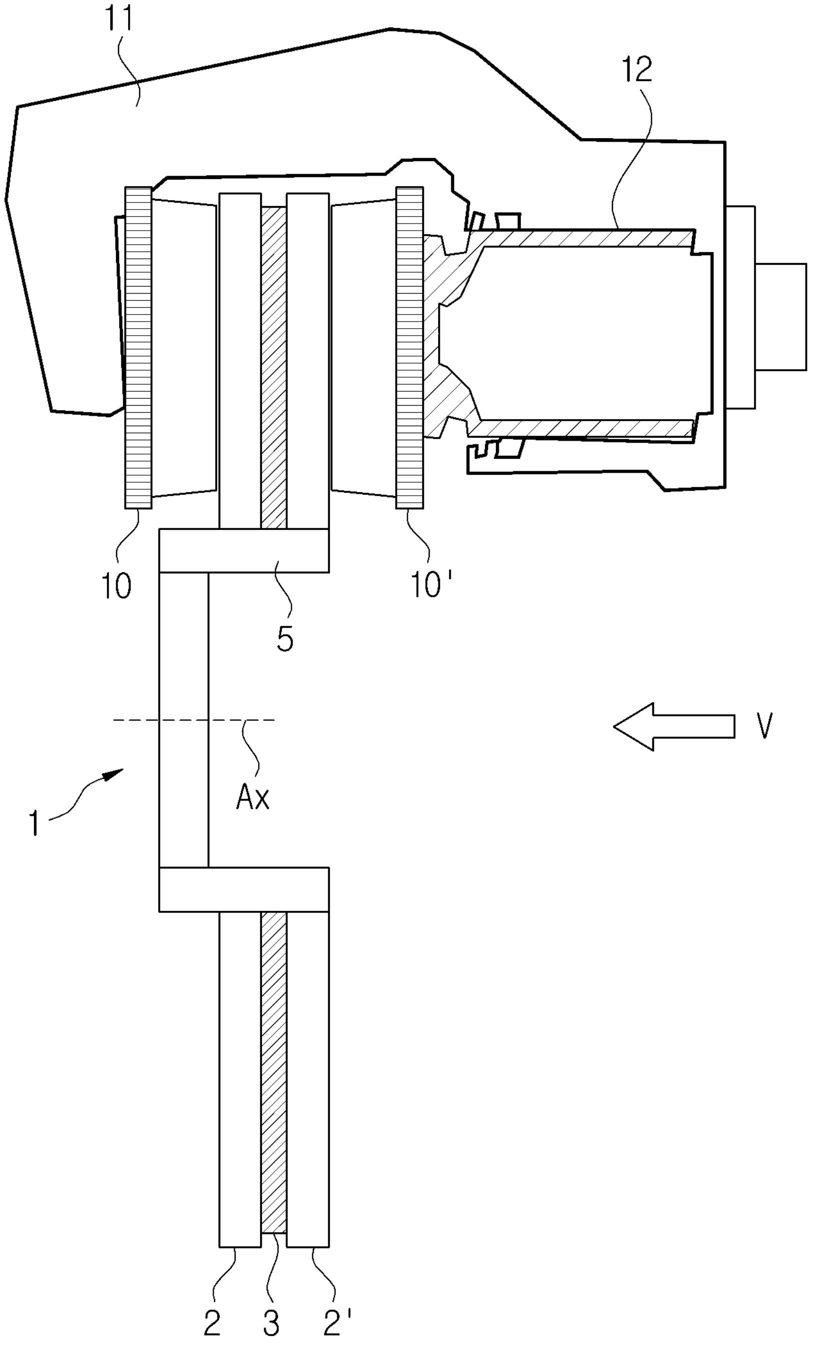
FIGS. 1-2 show components of a disk brake system.
Figure 2:
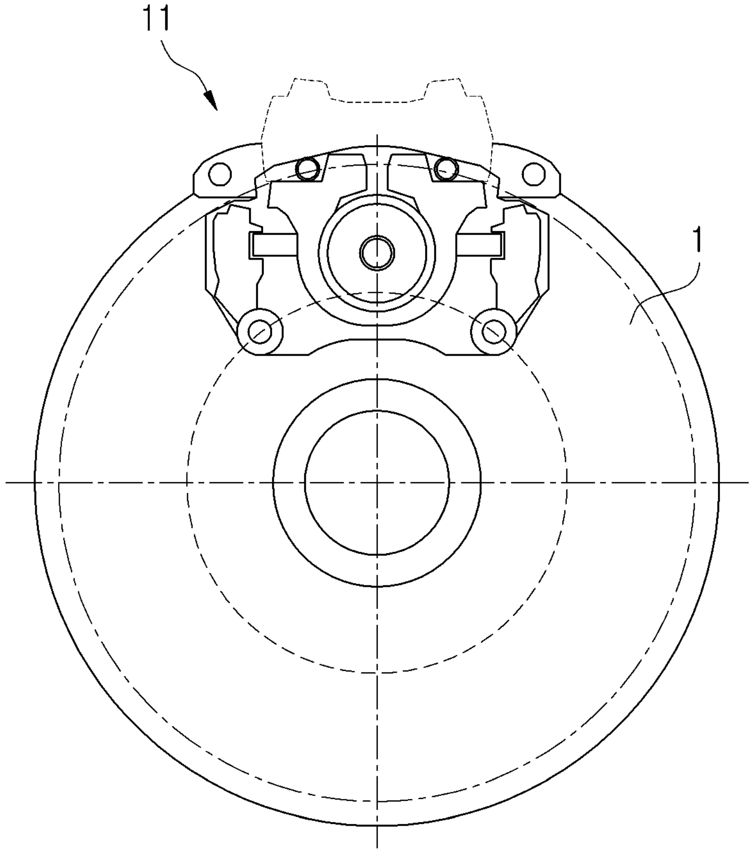

FIG. 1 shows a cut through a disk brake system, comprising a brake disk 1 and a caliper 11 holding a first brake pad 10 and a second brake pad 10'. FIG. 2 shows a side view V (as indicated in FIG. 1) onto the disk brake system.

The brake disk 1 comprises a first friction ring 2 for engagement with the first brake pad 10, a second friction ring 2' for engagement with a second brake pad 10' opposite to the first brake pad 10, and an interlayer 3 interposed between the first friction ring 2 and the second friction ring 2'. The interlayer 3 has a shape elasticity and is configured to be compressed in an axial direction (along axis Ax) during application of brake pressure by way of the brake pads 10, 10'.

By way of example, the caliper 11 is shown as a floating caliper. The invention may also be used with a fixed caliper, for example. The caliper 11 has a piston 12. When the chamber in which the piston 12 is located is pressurized, the second brake pad 10' presses against the second friction ring 2', and the caliper moves to the right, pressing the first brake pad 10 against the first friction ring 2. As the brake pads 10, 10' press against the two friction rings 2, 2', they effect axial compression of the interlayer 3, from an initial non-compressed state to a compressed state. When the brakes are released, a restoring elastic force of the interlayer 3 effects an outward movement of the friction rings 2, 2', towards the brake pads 10, 10', as the interlayer 3 resumes the non-compressed state. Under the restoring force, the brake disk 1 acts like a spring that exerts an outward push or thrust on the brake pads 10, 10'. The expanding brake disk 1 thus delivers an impact effect on the brake pads 10, 10', the brake pads 10, 10' gaining outward momentum away from the disk 1.

The interlayer 3 and the first friction ring 2 and the second friction ring 2' are formed by separate parts that have been joined together. The interlayer 3 is made from a different material than the first friction ring 2 and the second friction ring 2'. The interlayer 3 is made from a material with a higher elasticity and lower brittleness than the friction rings.

The interlayer 3 comprises steel and/or grey cast iron and/or aluminum.

The first friction ring 2 and the second friction ring 2' comprise grey cast iron and/or ceramics.

Figure 3:
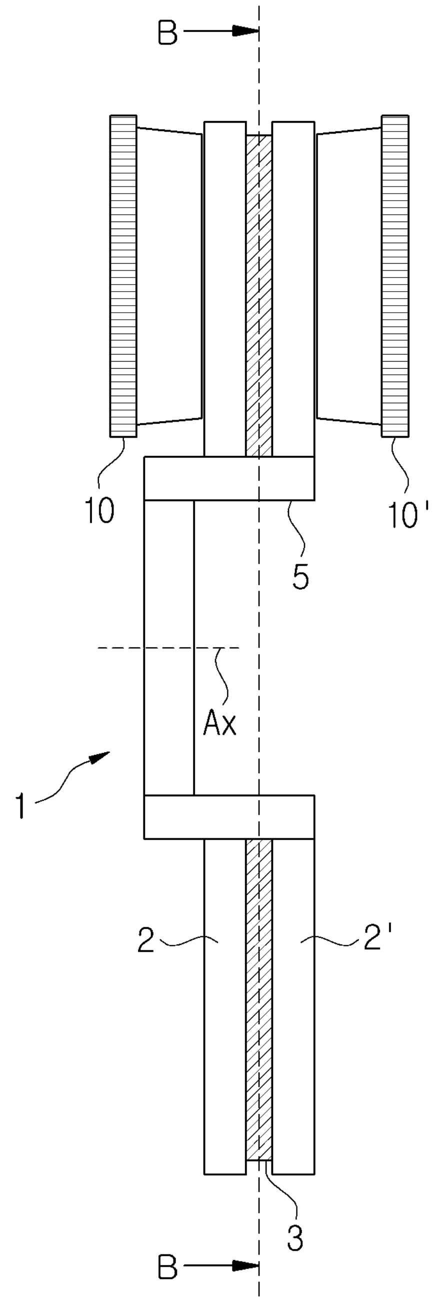
FIG. 3 shows a cut view of the disk brake system, indicating a cut B-B through a brake disk of the brake system.

FIG. 3 shows a similar view as FIG. 1. The caliper is omitted. A cut B-B is indicated in FIG. 3, which runs through a center of the interlayer 3. This cut is shown, for different embodiments of the interlayer, in FIGS. 4-7.

FIGS. 4-7 show that the shape elasticity is provided by way of at least one hole 4 or recess in the interlayer 3.

Figure 4:
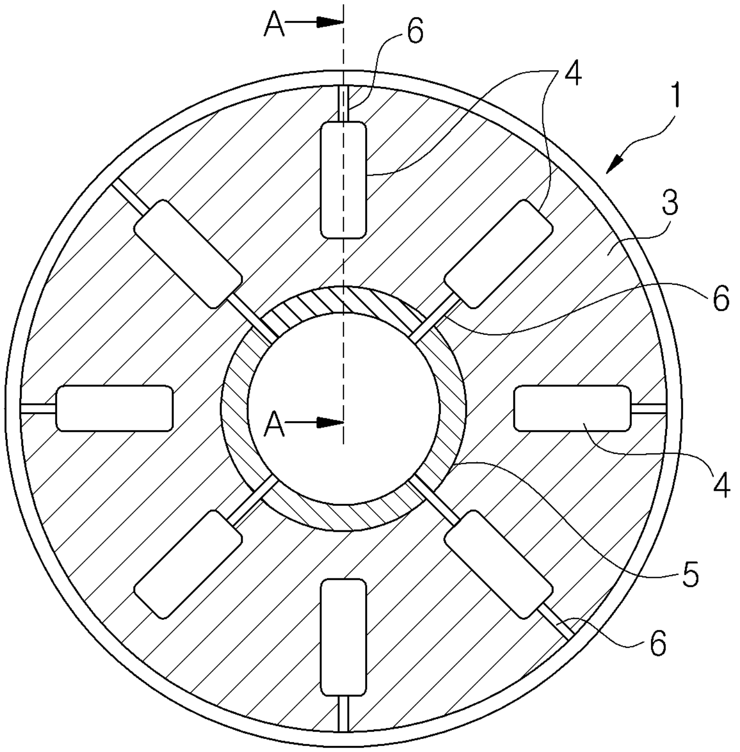
FIGS. 4-7 show different embodiments of the brake disk in cut view B-B.

FIG. 4 shows an embodiment, wherein the interlayer has several holes 4 extending radially along a portion of a width of the interlayer. In the cut view, which is in a plane orthogonal to the axial direction Ax, the holes 4 exhibit an essentially rectangular cross-section.

By way of example, it is illustrated in FIG. 4 that the holes may be connected to a circumferentially inner edge and/or a circumferentially outer edge of the interlayer 3. Specifically, for example, channels 6 may be provided, leading from the rectangular voids forming the holes 4 to the respective edge. It may be envisioned that a channel 6 is provided only to the outer edge, as shown exemplarily for the hole at 12 o'clock, or, that a channel 6 is provided only to the inner edge, as shown for instance for the hole between 1 o'clock and 2 o'clock, or, that two channels 6 are envisioned, one to each edge, as shown for the hole located between 4 o'clock and 5 o'clock. All holes may thereby be carried out in the same manner or in manners different from each other.

Figure 5:
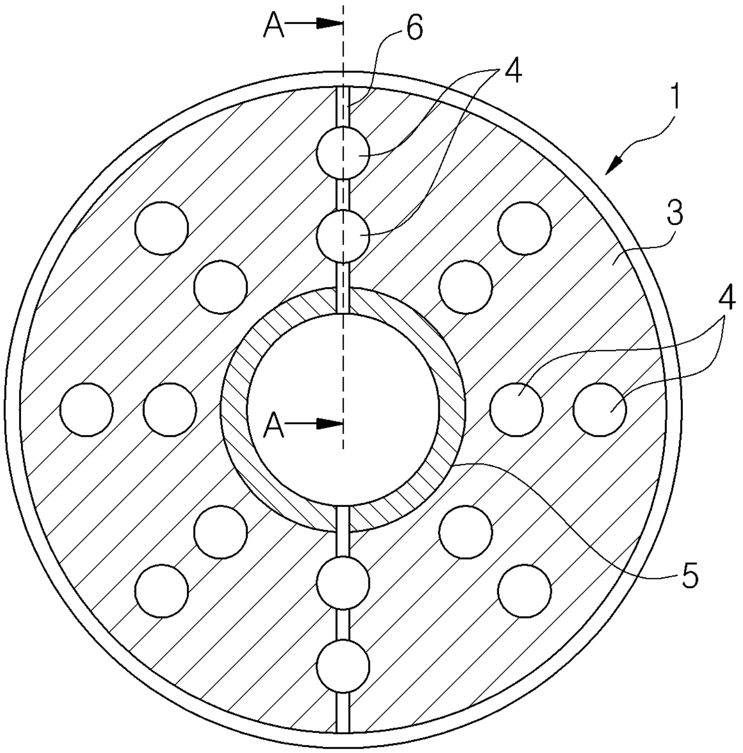

FIG. 5 shows an example, wherein the holes 4 have an essentially circular cross section. Based on a cylindrical coordinate system centered at the axis Ax, two holes are arranged along the radial coordinate for each of several polar angles. It may be envisioned to have more than two holes 4 along the radial coordinate, for example, and/or to have holes at more than 8 polar angles. As indicated exemplarily for the sets of holes at 12 o'clock and 6 o'clock, there may be channels 6 connecting the holes 4 to each other and to the outer and/or inner circumferential edge.

Figure 6:
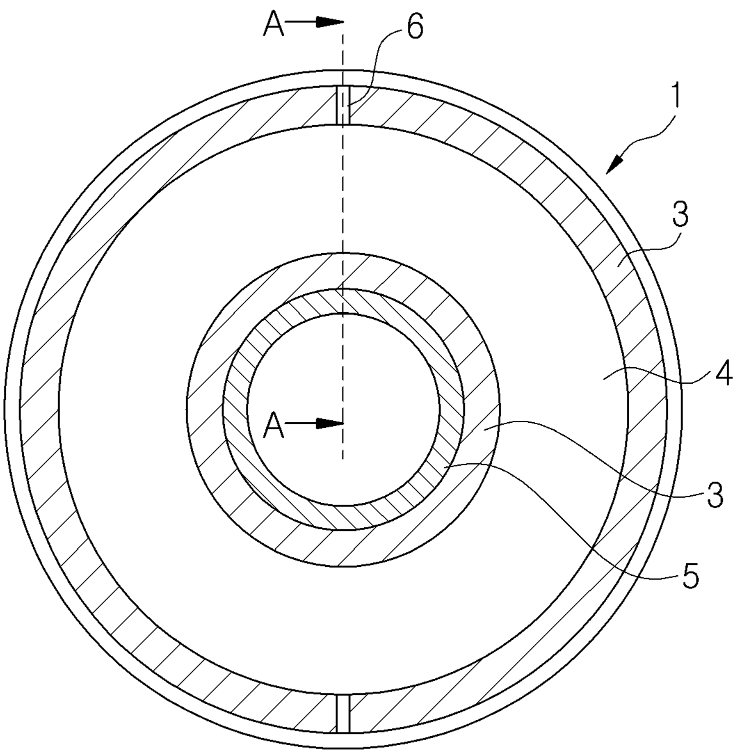
Figure 7:
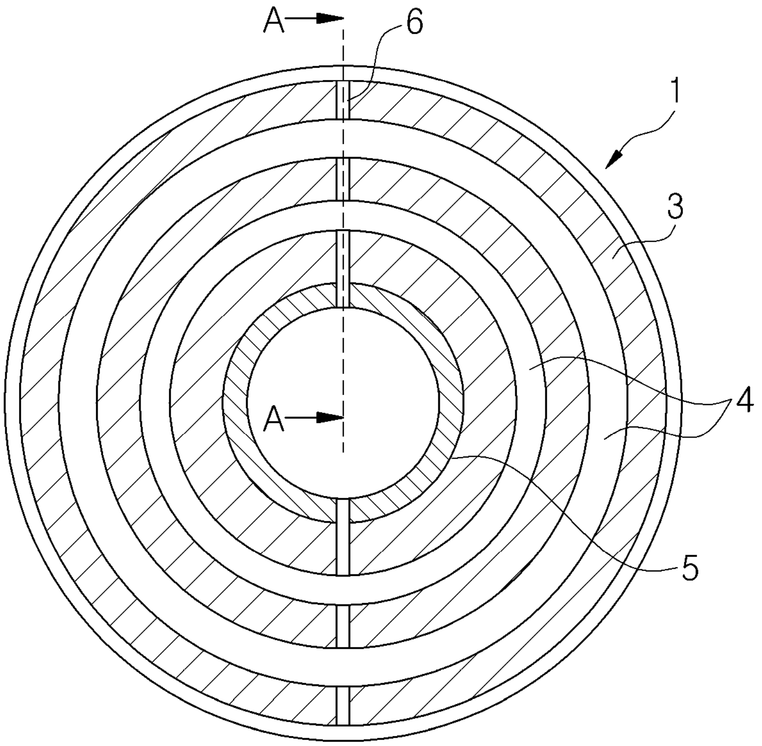

FIGS. 6 and 7 show embodiments where the interlayer 3 comprises at least one hole 4 or recess extending circumferentially at least along a part of a circumference of the brake disk 1. Specifically, in the case of FIG. 6, one circumferential hole extends all the way around the interlayer 3. At several locations along the circumference, channels 6 are provided, connecting the hole 4 to an edge of the brake disk 1. In the case of FIG. 7, two concentric circumferential holes are shown. They are connected to each other and to the edges of the brake disk 1 by channels 6.

In FIGS. 4-6, a line indicates a cut A-A through the break disk 1, from the circumferential outer edge to the circumferential inner edge, and through the hole(s) 4. This cut A-A is shown in FIGS. 8-21, for different embodiments of the holes 4. The hub 4, which may or may not extend in the region of the interlayer 4 (cf. FIGS. 22-24), is omitted in these views.

Figure 8:
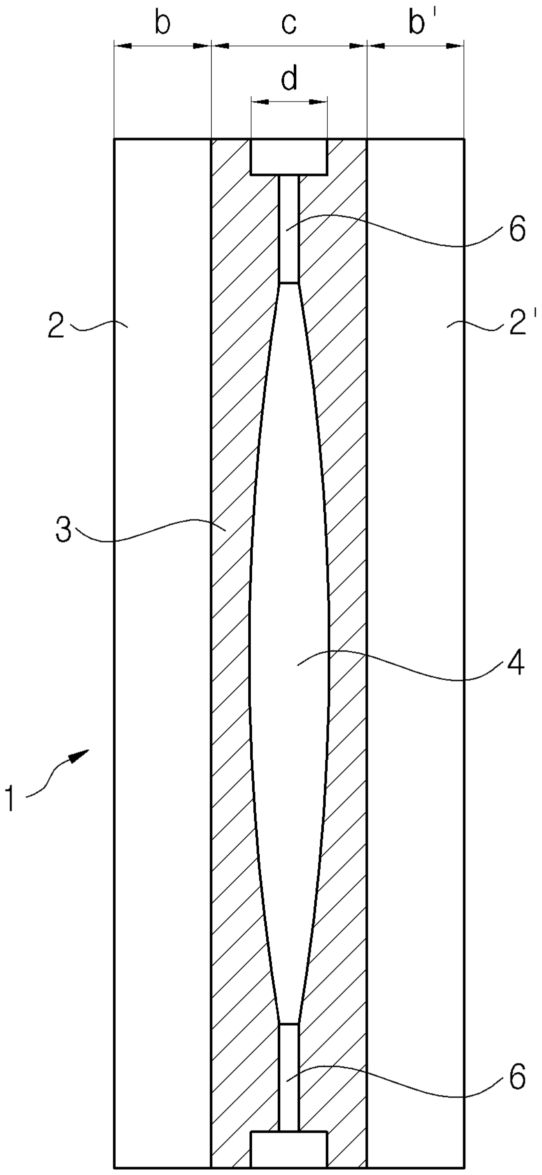
FIGS. 8-21 show different embodiments of the brake disk in a further cut view A-A.

FIG. 8 shows an embodiment, where a hole 4 having an essentially elliptical or almond-shape cross section in the plane spanned by the axial direction and the radial direction is present in the interlayer 3. Without being limited to these possibilities, this may be the hole of FIG. 4, or of FIG. 6, for example. The hole 4 is connected to both edges by way of channels 6.

Figure 9:
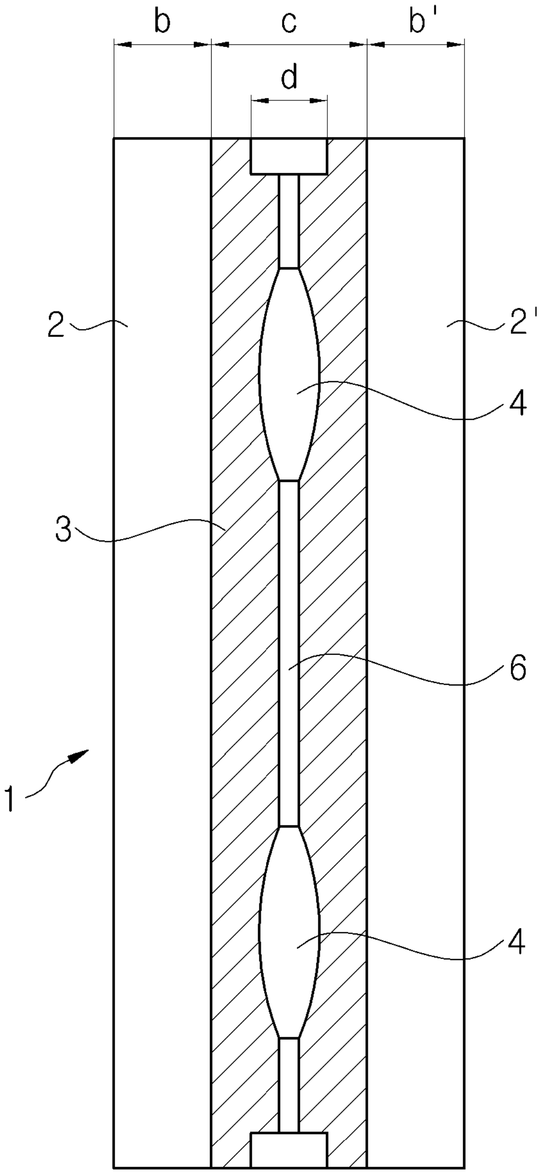

FIG. 9 shows the same view as FIG. 8. Here, two holes 4 are provided, at different radii, the holes 4 being connected to each other and to the outer and inner edge by channels 6. The holes also have an essentially elliptical cross section. Without being limited to these possibilities, this may be the holes of FIG. 5, or of FIG. 7, for example.

Figure 10:
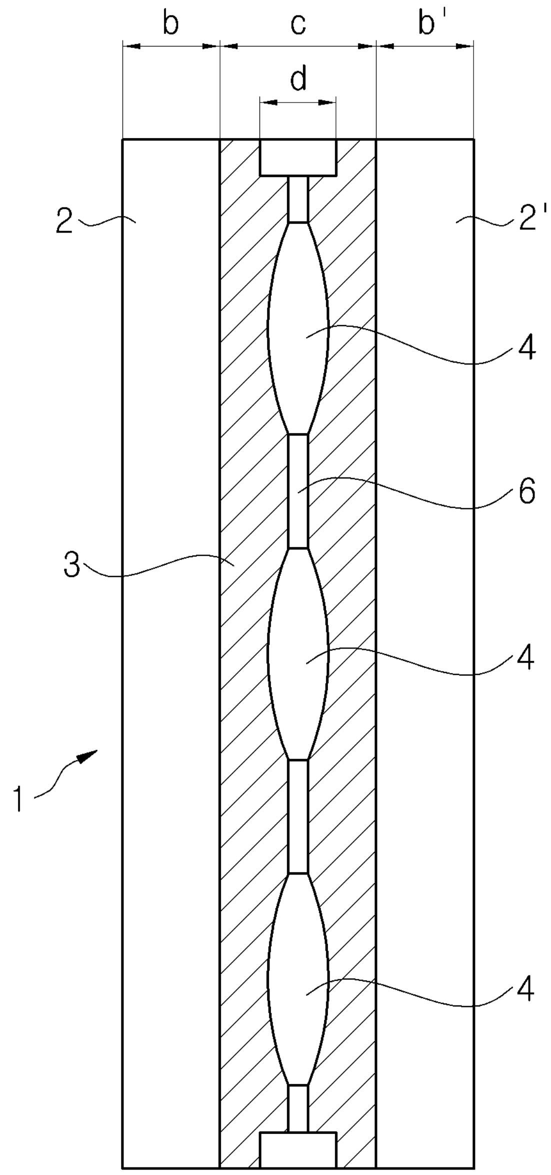

FIG. 10 shows three holes being provided at different radii, which holes also have an essentially elliptical cross section.

In FIGS. 8-10, some dimensions are indicated. Specifically, a thickness b, b' of each of the friction rings in the axial direction is about 6 mm. A thickness c of the interlayer in the axial direction is between 7 mm and 15 mm. A width d of the holes 4, in the axial direction, measured at the widest point, is approximately 4 mm in the relaxed state.

Figure 11:
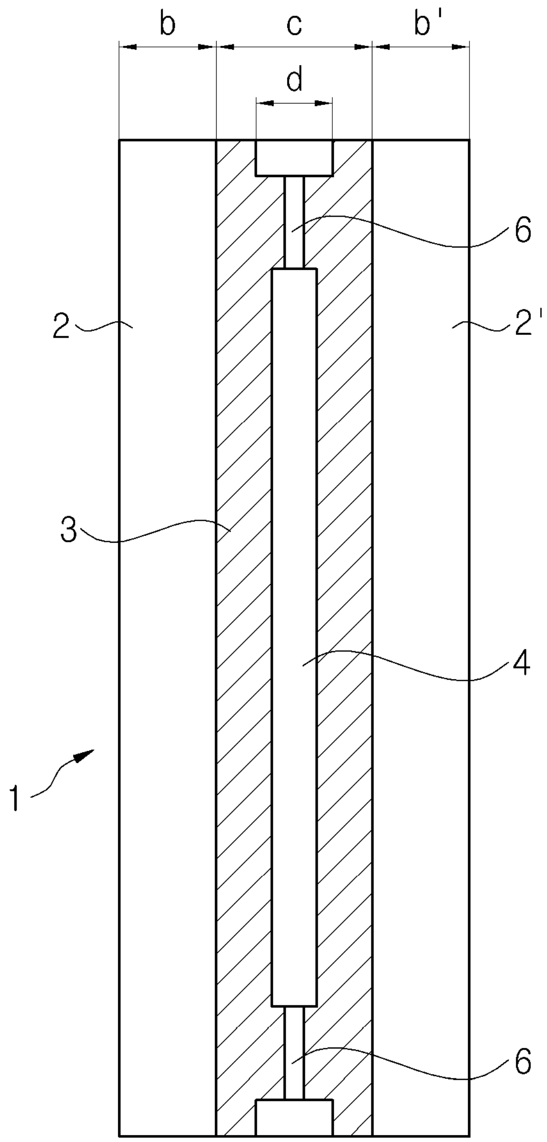
Figure 12:
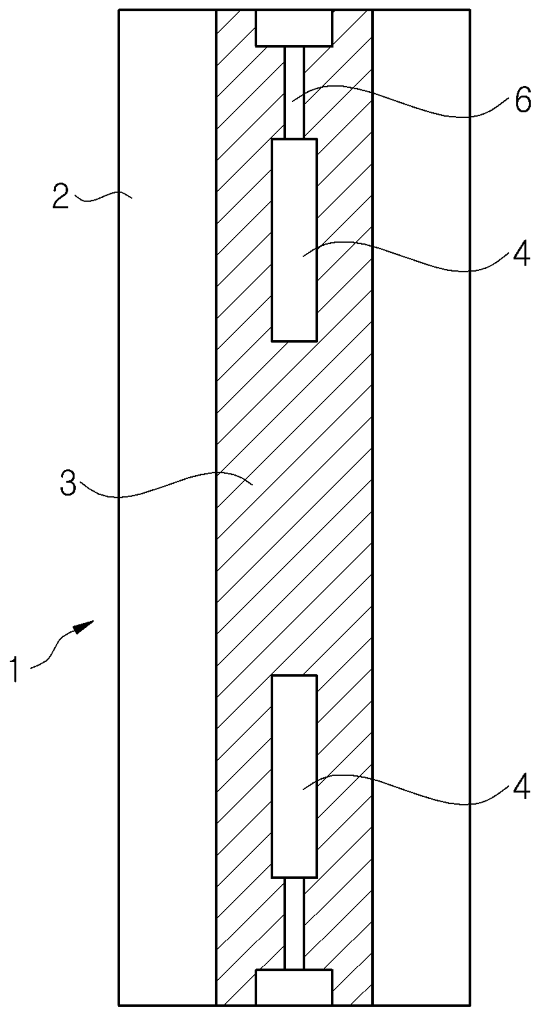
Figure 13:
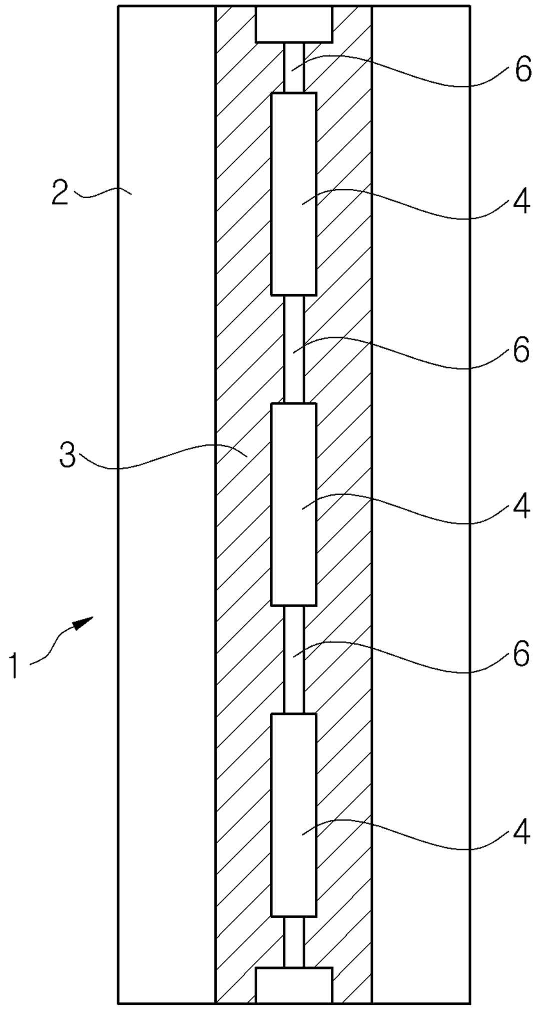

FIGS. 11-13 show embodiments where the holes 4 have a cross section that is essentially rectangular, in the cut plane spanned by the axial direction and the radial direction.

The embodiment of FIG. 11, exposes one hole 4. Without being limited to these possibilities, this may be a way of carrying out the hole of FIG. 4, or of FIG. 6, for example.

The embodiment of FIG. 12 exposes two holes 4. Without being limited to these possibilities, may be a way of carrying out the holes 4 of FIG. 5, or of FIG. 7 for example.

FIG. 13 shows three holes being provided at different radii, which holes also have an essentially rectangular cross section.

Dimensions are once again exemplarily indicated in FIG. 11. Thickness b, b' of each of the friction rings in the axial direction is about 6 mm. A thickness c of the interlayer in the axial direction is between 7 mm and 15 mm. A width d of the holes 4, in the axial direction, measured at the widest point, is approximately 4 mm in the relaxed state.

FIGS. 14-21 show that the holes may comprise at least two holes or recesses that are arranged in-plane, or out-of-plane, with regard to each other, as considered in a plane that is orthogonal to the axial direction. A vertical line in each case indicates a center of the interlayer 3.

Figure 14:
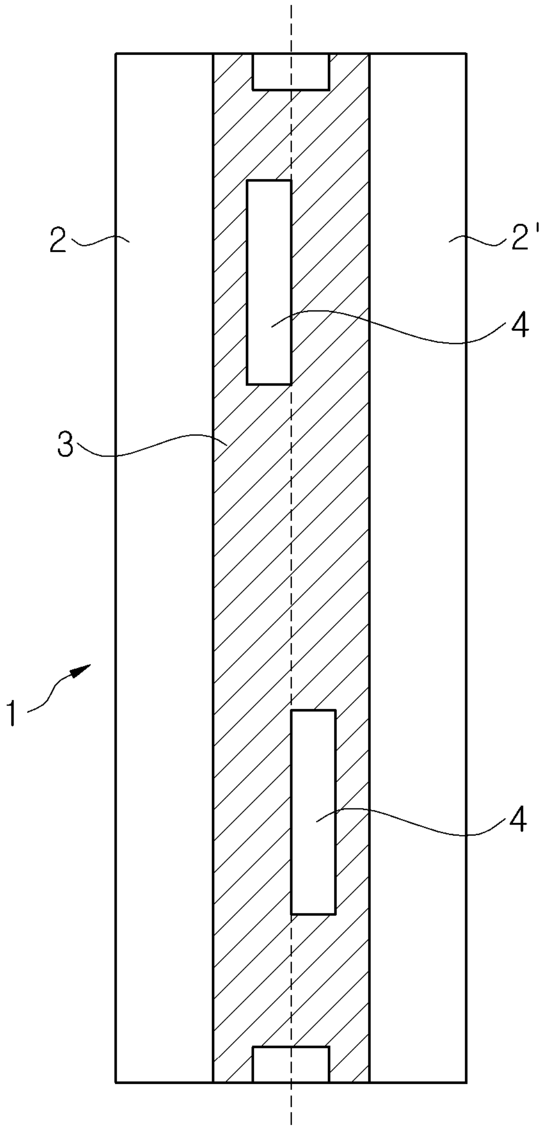

For example, FIG. 14 indicates two holes 4 arranged along the same radial coordinate, at different radii. The lower hole, which is the circumferentially inner hole, is offset to the right, and the upper hole, which is the circumferentially outer hole 4 is offset to the left, i.e., they are out of plane with regard to each other, as considered in a plane that is orthogonal to the axial direction. By way of example, the brake disk 1 may be configured such that the left side faces a caliper finger, and the right side faces a piston of the caliper (as shown in FIG. 1).

Figure 15:
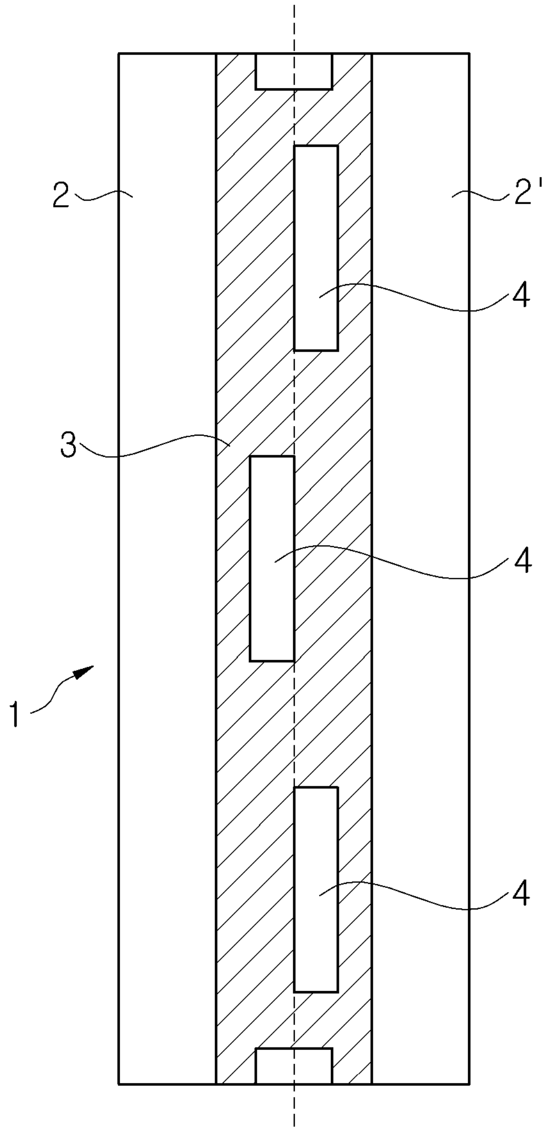

FIG. 15 shows three holes arranged along the same radial coordinate, a central hole being offset from the circumferentially inner and circumferentially outer hole.

FIGS. 16-21 show embodiments having a multitude of holes arranged along a given radial coordinate.

Figure 16:
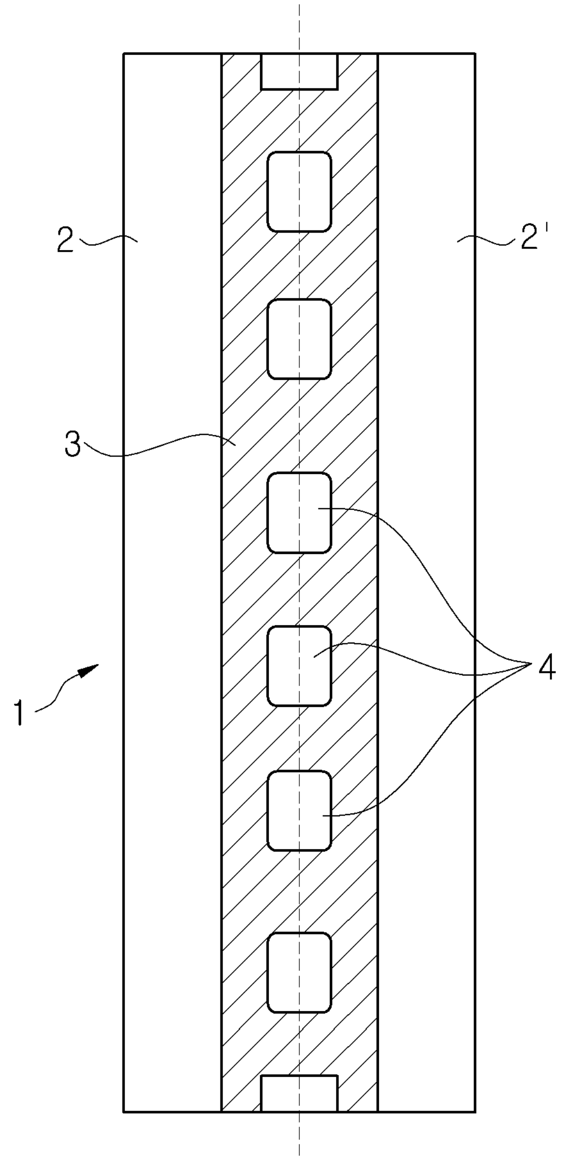

In FIG. 16, six holes having an essentially rectangular cross section are arranged in-plane with regard to each other, along a center of the interlayer 3.

Figure 17:
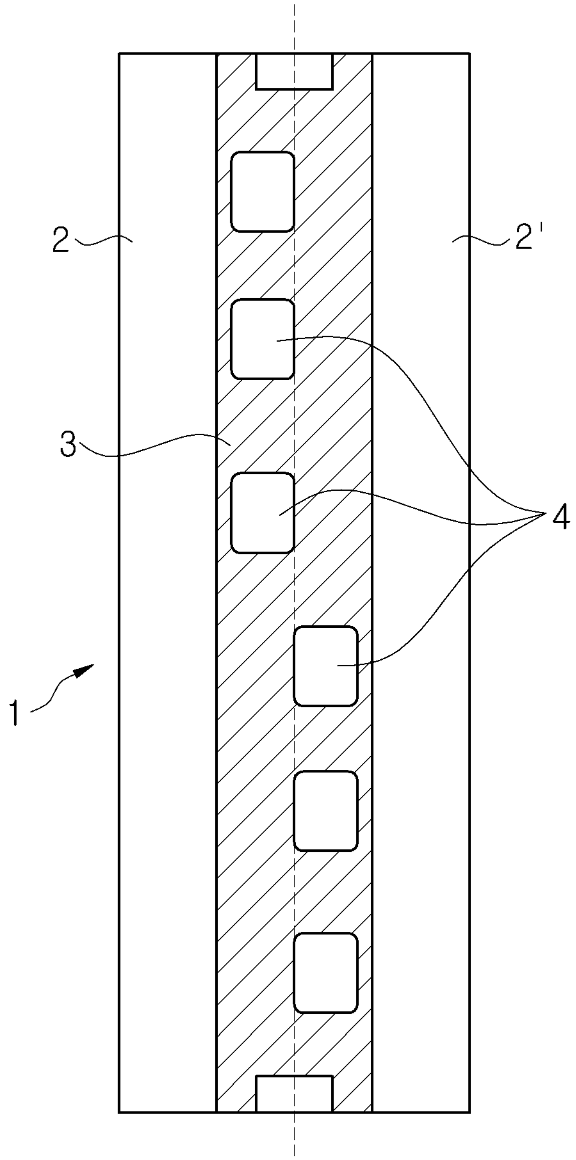

In FIG. 17, six holes having an essentially rectangular cross section are arranged along the same radial coordinate. They are out-of-plane, by having the lower three holes, which are circumferentially inner holes, offset to the right from the center, and the upper three holes, which are circumferentially outer holes, offset to the left from the center.

Figure 18:
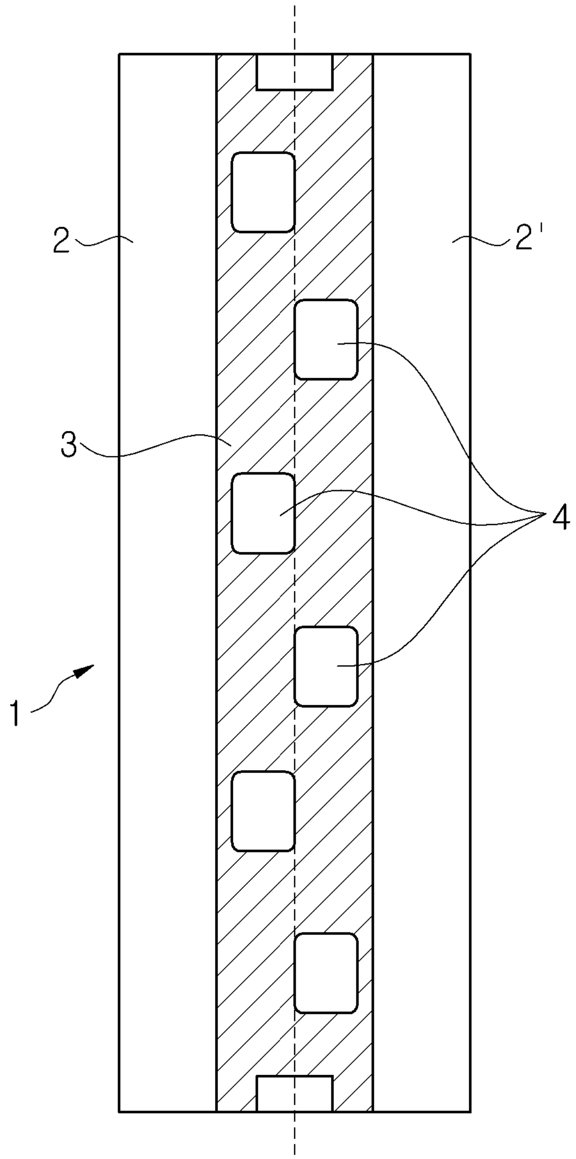

In FIG. 18, six holes having an essentially rectangular cross section are arranged along the same radial coordinate. They are out-of-plane, by having them offset from the center, to the right and left, in an alternating fashion.

Figure 19:
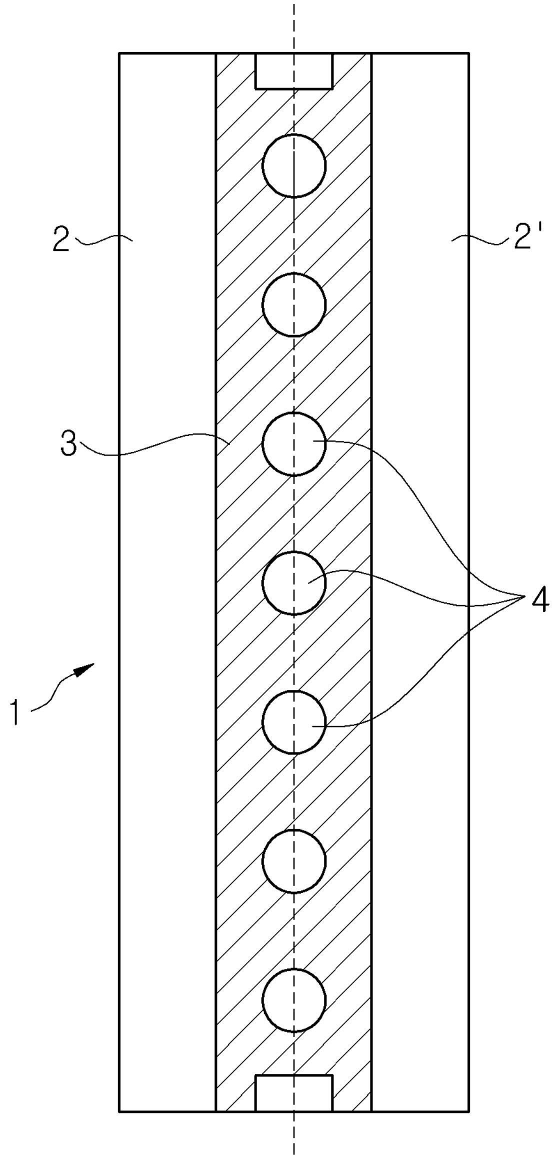
Figure 20:
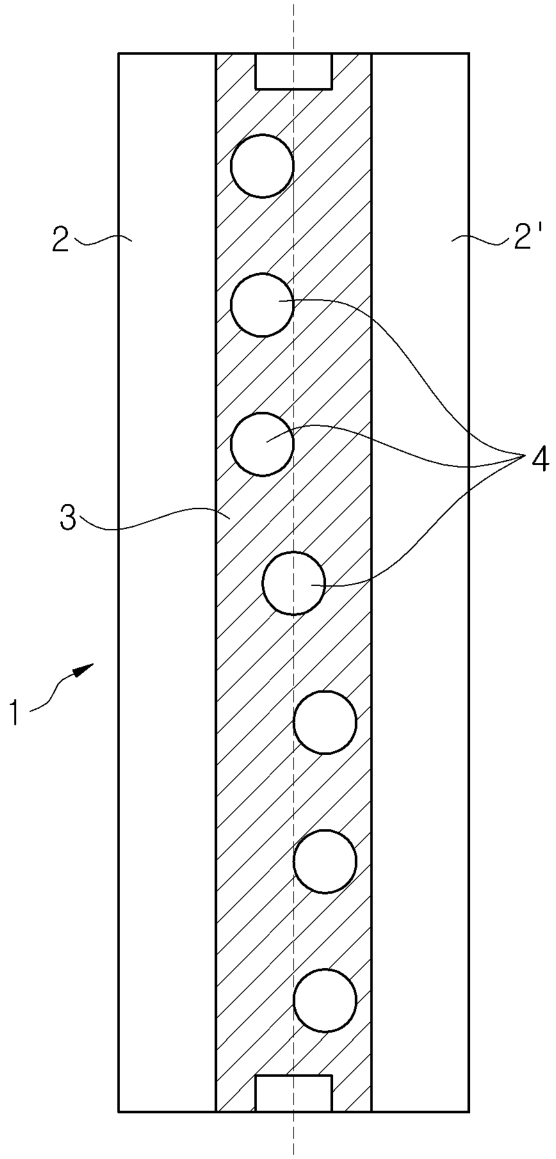
Figure 21:
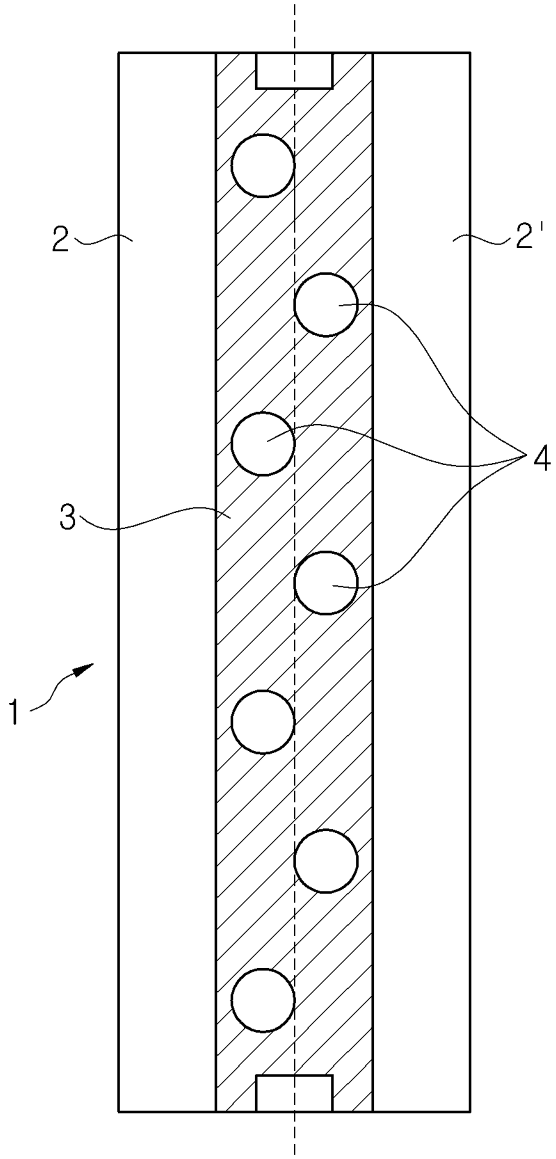

FIGS. 19-21 illustrate a similar concept as FIGS. 16-18, but this time with holes having an essentially circular cross section. FIG. 19 shows an in-plane-arrangement of seven circular holes. FIG. 20 shows an arrangement with circular holes, the circumferentially inner holes being offset to one side, and the circumferentially outer holes to the other, and FIG. 21 shows the circular holes being offset from the center in an alternating fashion.

Figure 22:
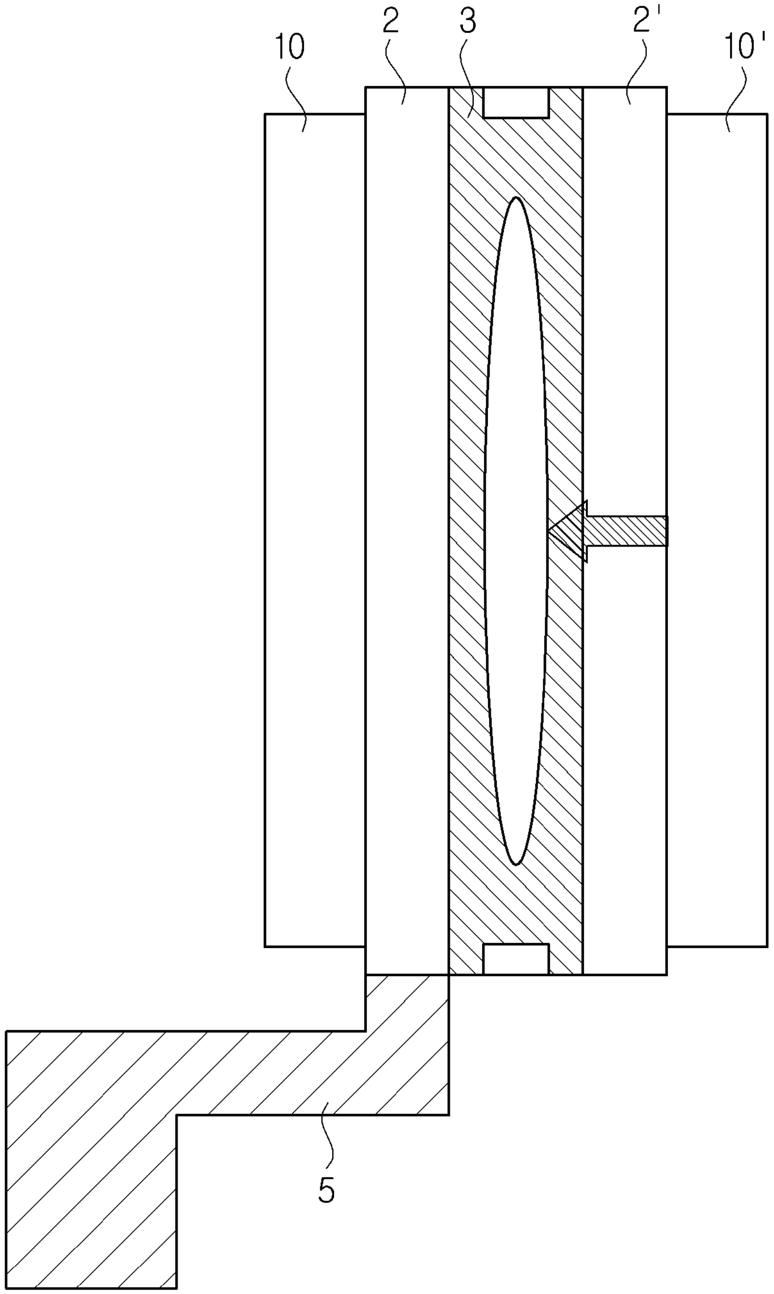
FIGS. 22-24 show various connection options for a hub.
Figure 23:
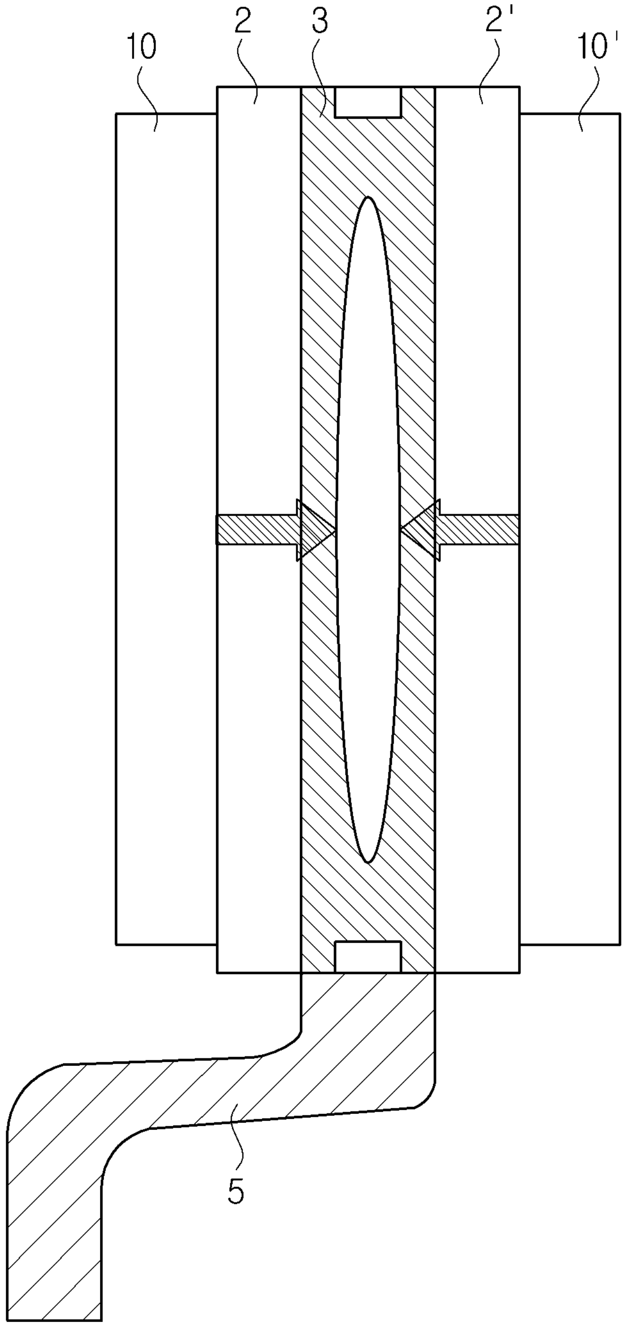
Figure 24:
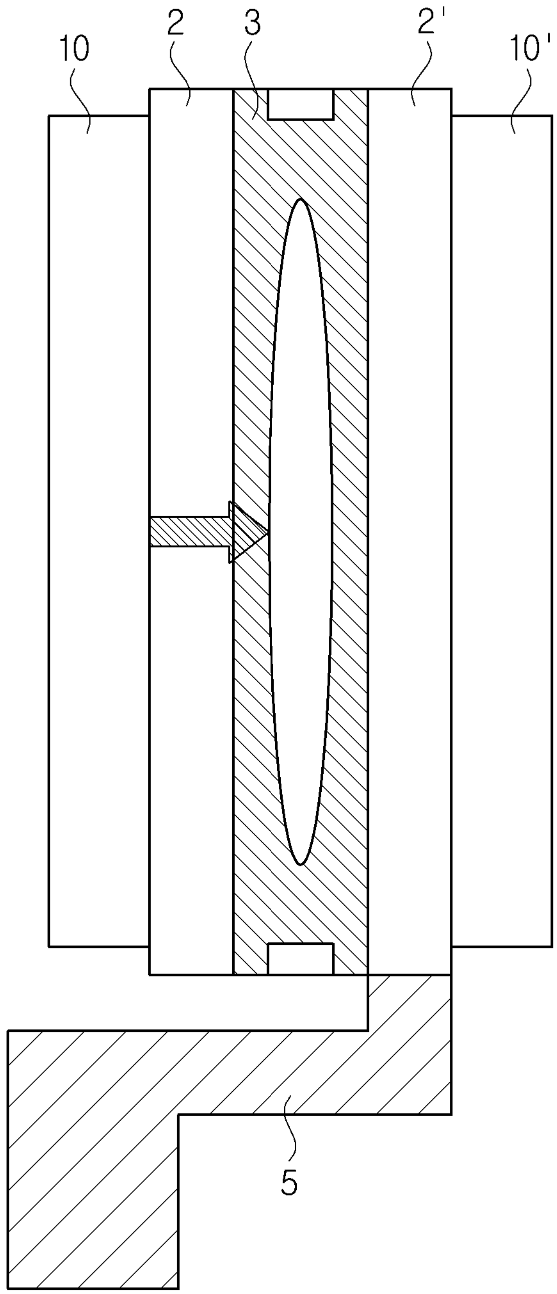

FIG. 22-24 illustrate attachment options for connecting the brake disk to the hub 5.

FIG. 22 shows that the left friction ring 2 is connected to the hub 5, enabling compression of the brake pad from the right. For example, the brake pad on the left may be held by the caliper finger, and the brake pad on the right may be connected to the piston 12.

FIG. 23 shows that the interlayer 3 is connected to the hub 5 of the brake disk 1, enabling compression from both sides, and consequently symmetric expansion after the brakes are released.

FIG. 24 shows that the right friction ring 2' is connected to the hub 5, enabling compression from the left.

Figure 25:
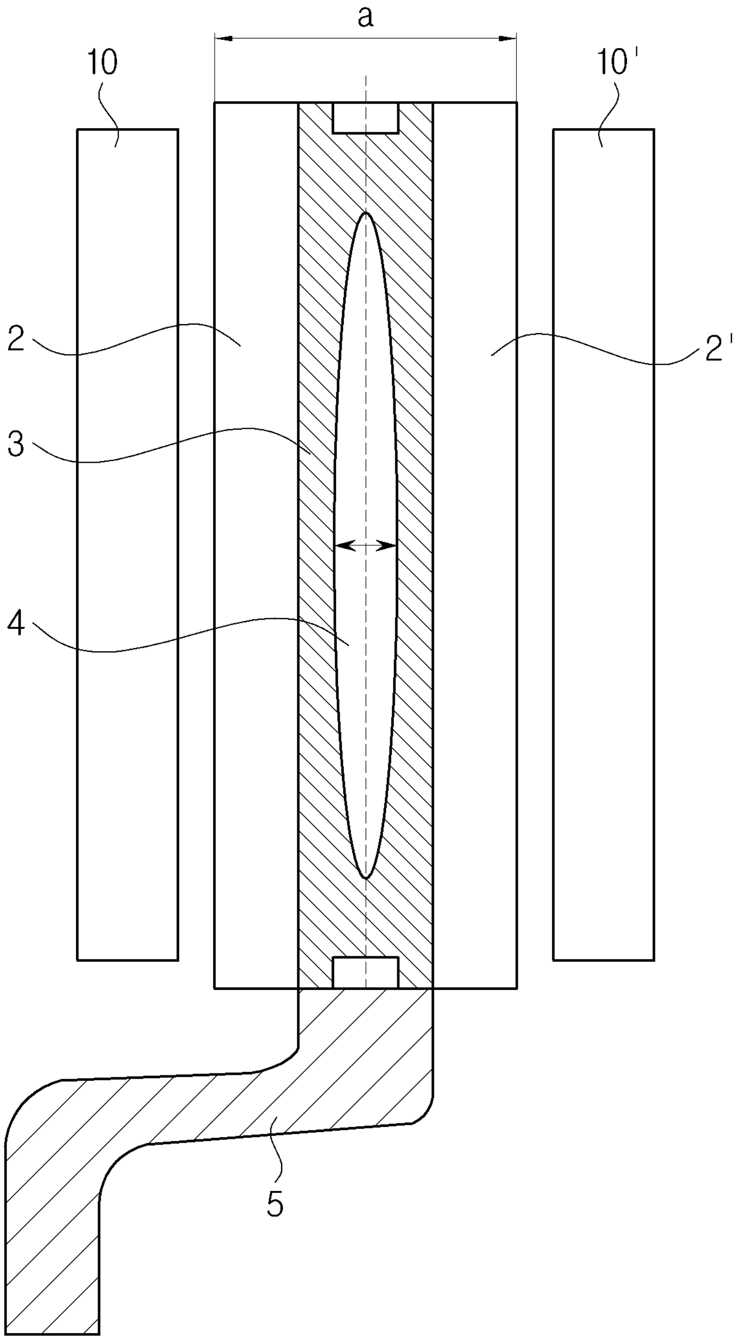
FIGS. 25-27 show a function and use of a brake system according to an embodiment.
Figure 26:
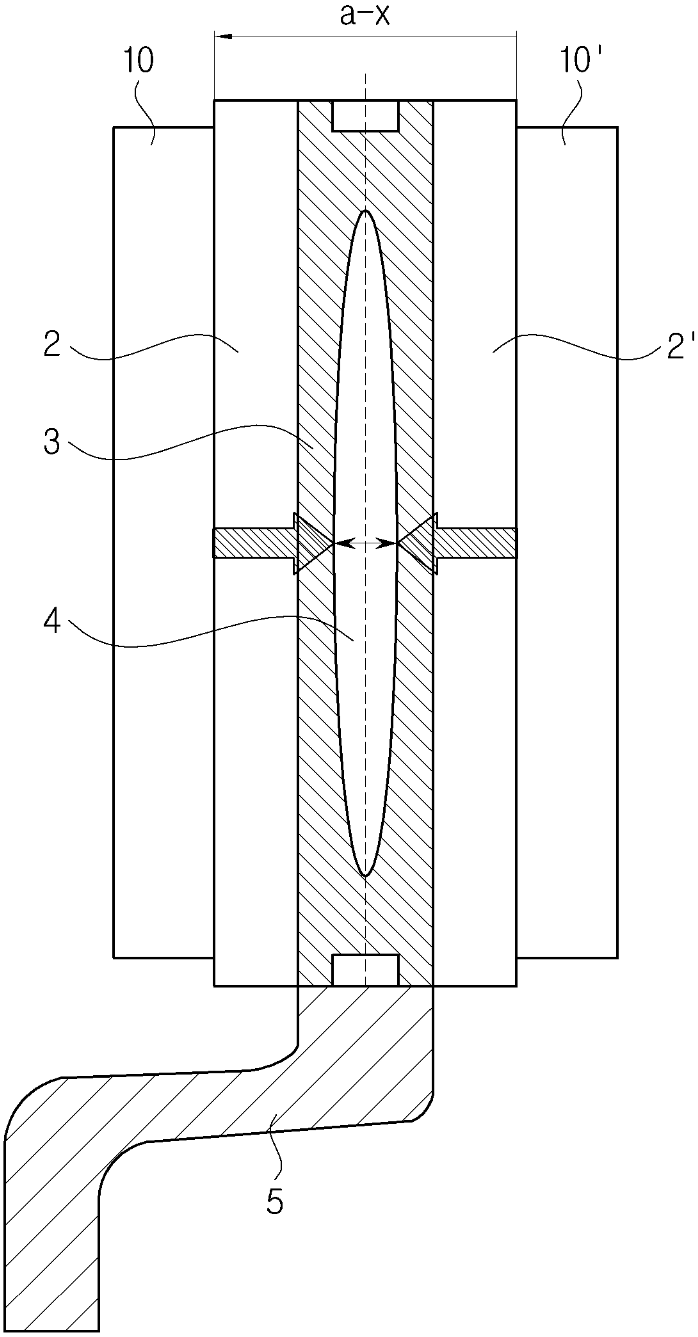
Figure 27:
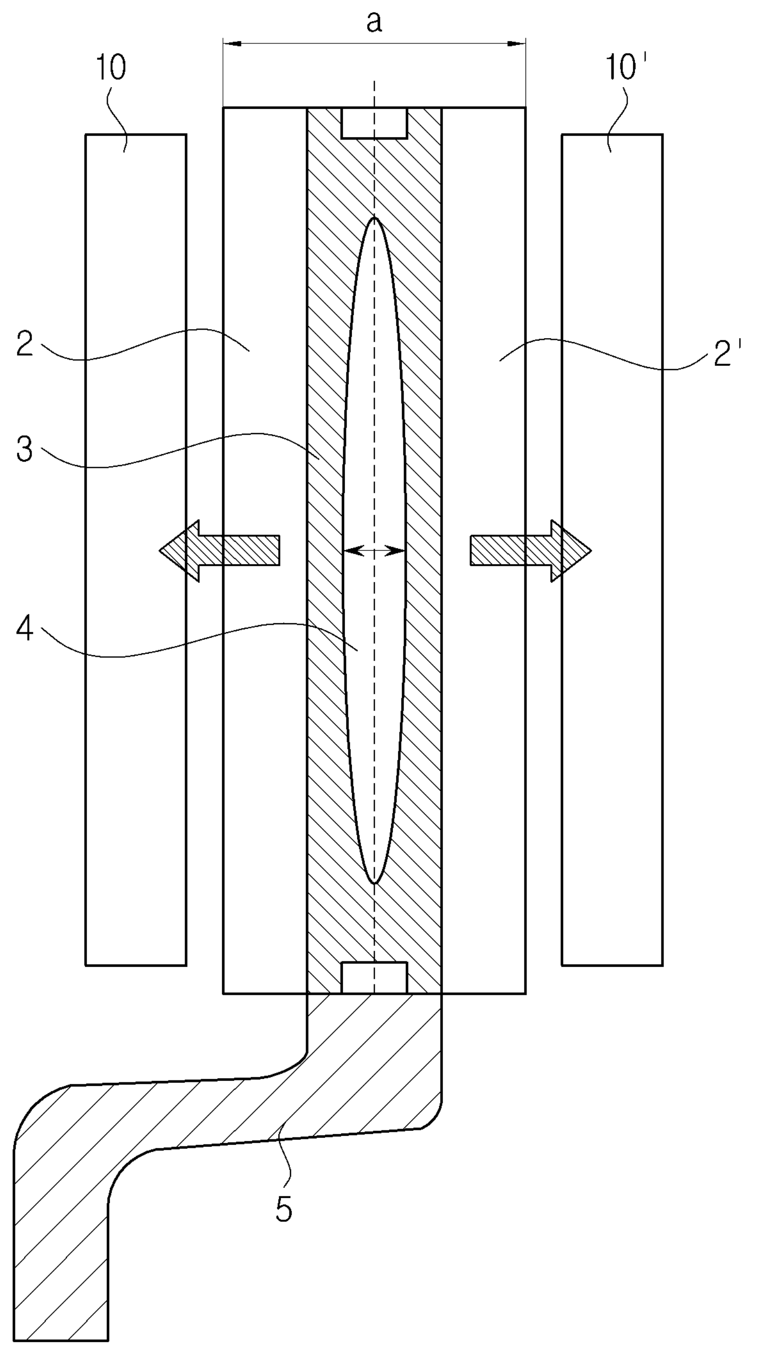

FIGS. 25-27 show a function and use of a brake system, wherein the interlayer 3 is connected to the hub 5. The initial state non-compressed state is shown in FIG. 25. In this non-compressed state, the brake disk has a total width a=b+c+b'. When the brakes are applied (FIG. 26), and the brake pads 10, 10' enter in contact with the friction rings 2, 2', symmetric compression of the interlayer 3, from both sides, is enabled through the shape elasticity of the interlayer. Thereby, the hole 4, through the choice of geometries and dimensions, enables controlled deformation, wherein the brake pad is compressed by x=0.2 mm at a brake pressure of 70 bars. Compression is limited at x=0.25 mm by way of the design features of the brake disk 1 and in particular the hole 4, for example. When the brake pressure is subsequently released (FIG. 27) a restoring elastic force of the interlayer 3 effects an outward movement of both the first friction ring 2 and the second friction ring 2' against the respective brake pad 10, 10', pushing both brake pads 10, 10' outward.

Figure 28:
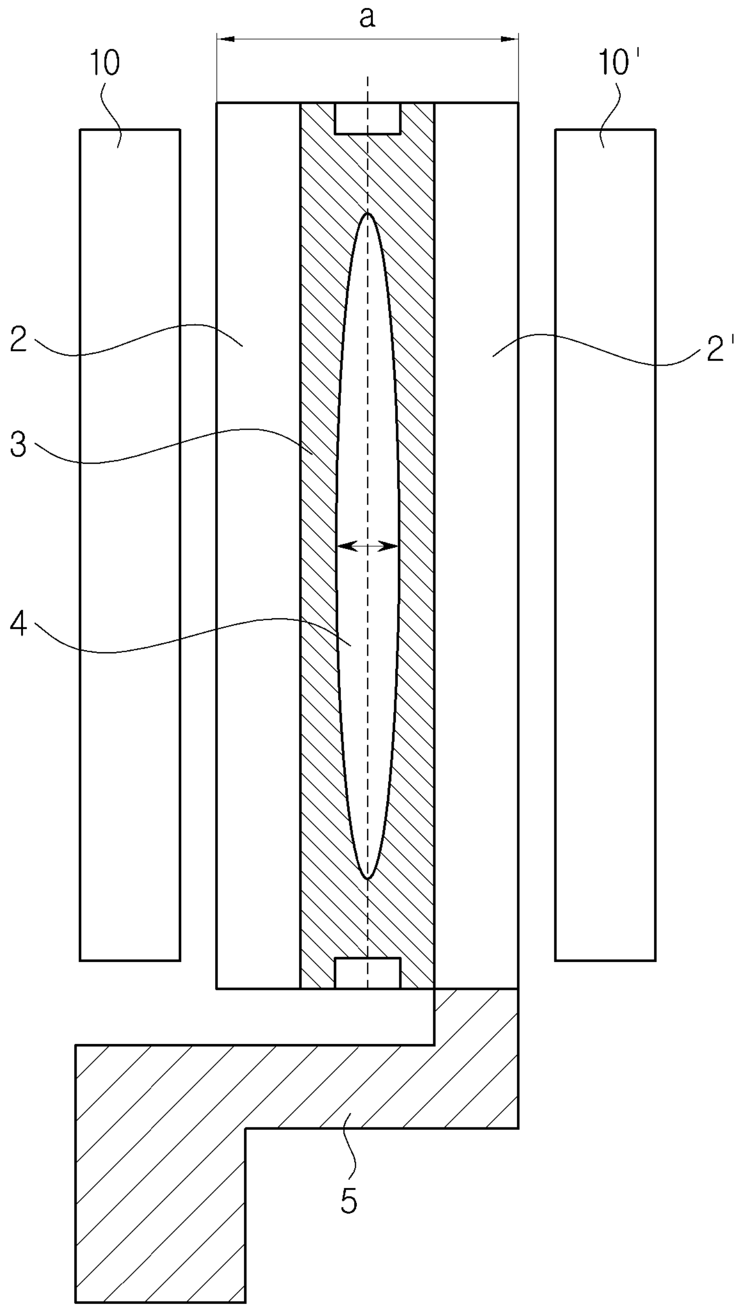
FIGS. 28-30 show a function and use of a brake system according to a further embodiment.
Figure 29:
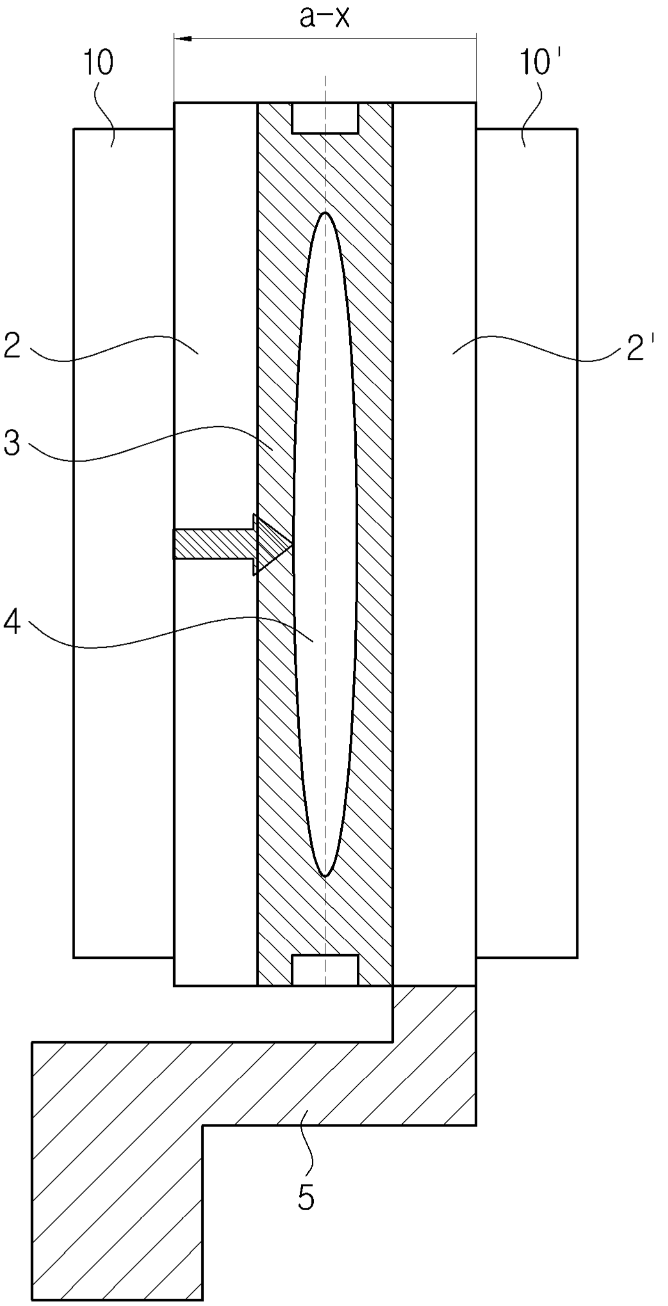
Figure 30:
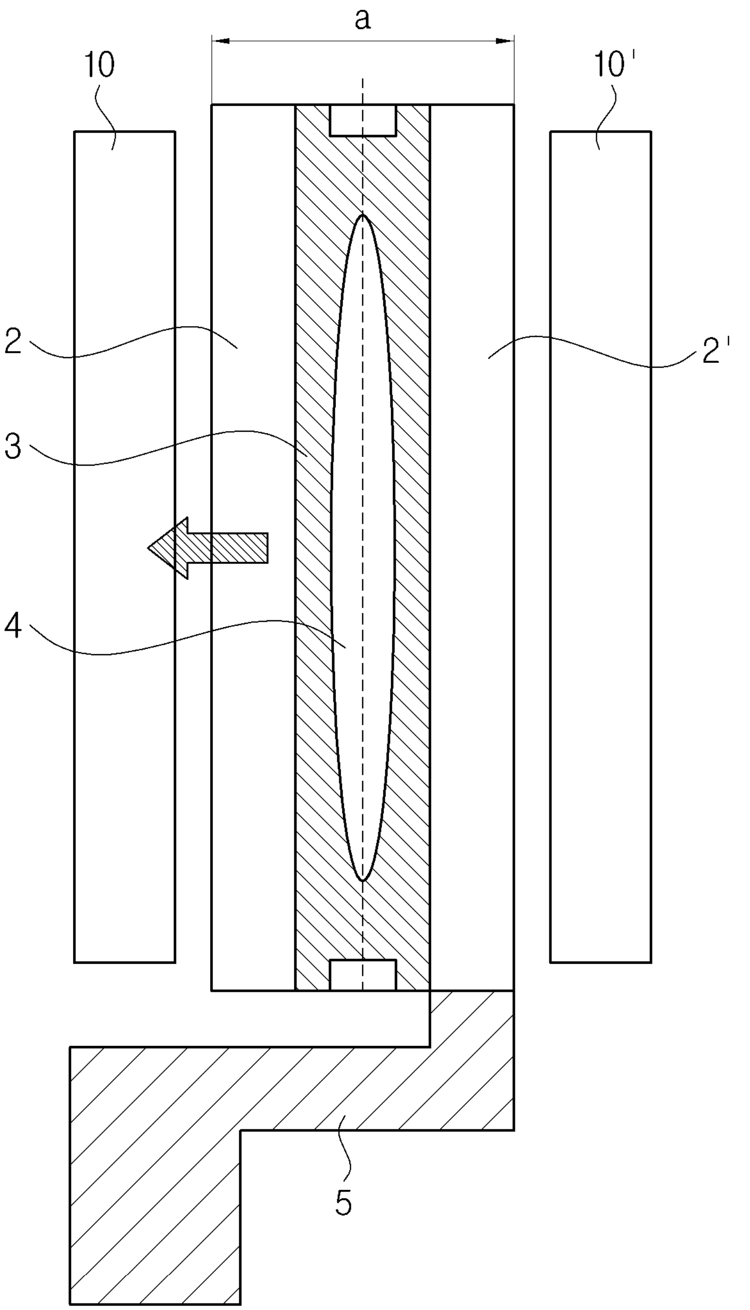

FIGS. 28-30 show a similar procedure as FIGS. 25-27. Here, the friction ring 2' is secured to the hub 5. Thus, axial compression of the brake disk takes place in an asymmetric fashion. As the brakes are applied, the left friction ring is moved inward, to the right, by way of the left brake pad 10. For example, a compression of 0.1 mm at 70 bars may be envisioned in the compressed state of FIG. 29. Upon expansion, the left friction ring springs outward, pushing the brake pad 10 away.

Figure 31:
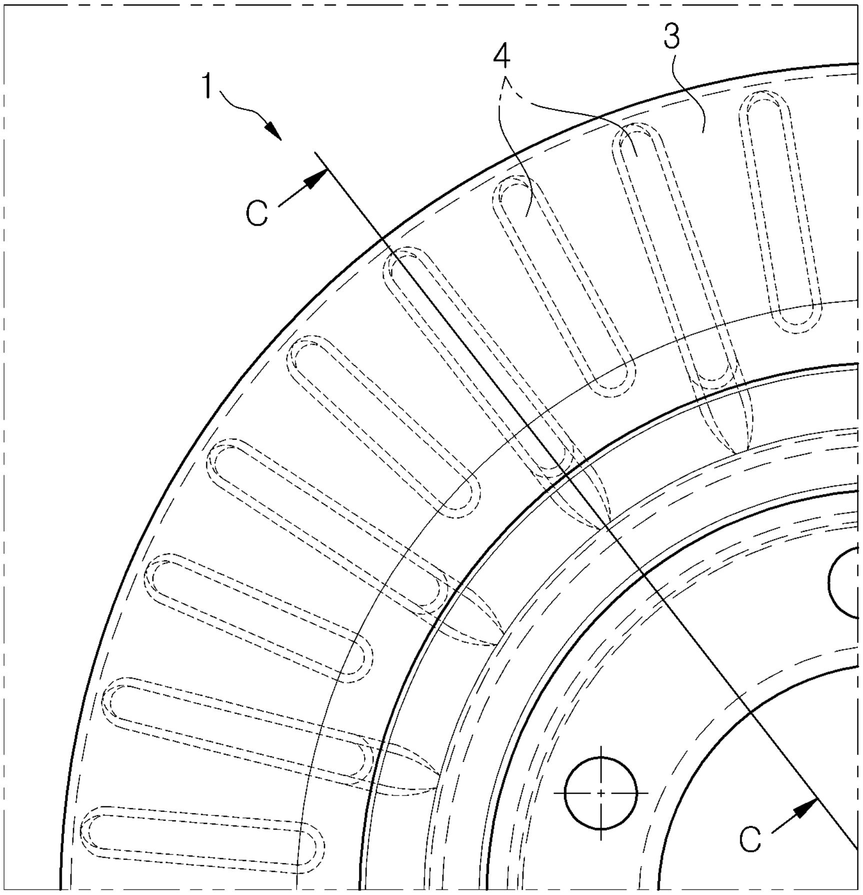
FIGS. 31-32 show views of a brake disk according to a further embodiment.
Figure 32:
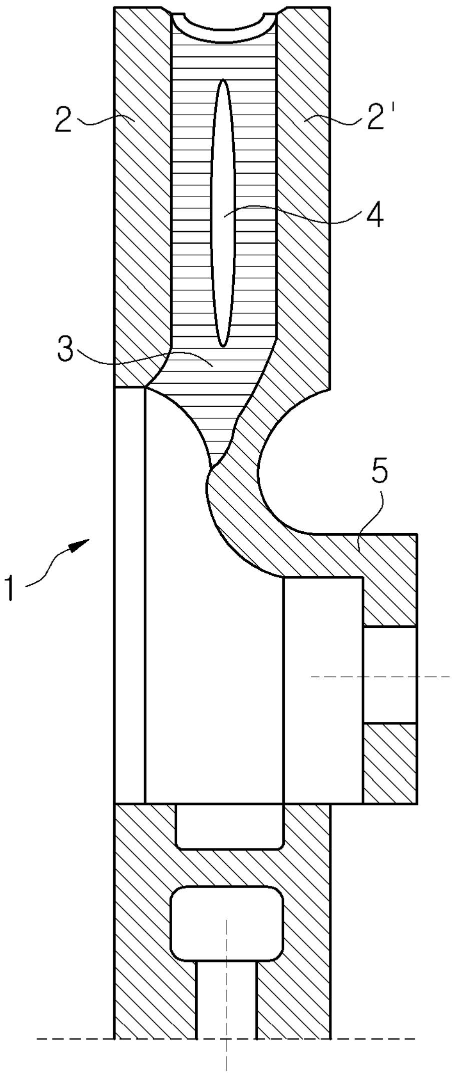

FIGS. 31-32 show a further embodiment, in two cut views. FIG. 31 exposes the interlayer 3, having several elongate holes 4 extending radially, which provide a shape elasticity. A cut A-A is indicated in FIG. 31. This cut is shown in FIG. 32. FIG. 32 shows that the hub 5 may be formed integrally with one of the friction rings.

What is claimed is:

1. A brake disk for a disk brake system, comprising:

a first friction ring for engagement with a first brake pad, a second friction ring for engagement with a second brake pad opposite to the first brake pad, and an interlayer interposed between the first friction ring and the second friction ring, the interlayer having a shape elasticity and being configured to be compressed in an axial direction during application of brake pressure by way of the brake pads, wherein the shape elasticity is provided by way of at least one hole or recess in the interlayer, and the at least one hole or recess is singularly provided in the axial direction so that the interlayer in which the at least one hole or recess is present is double-walled.

2. The brake disk according to claim 1, wherein a width of the at least one hole or recess in the axial direction is at least 3 mm to at most 5 mm, and wherein a thickness of each of the first and second friction rings in the axial direction is between 4 mm and 8 mm or a thickness of the interlayer in the axial direction is between 7 mm and 15 mm.

3. The brake disk according to claim 1, wherein the at least one hole or recess extends circumferentially at least along a part of a circumference of the brake disk or the at least one hole extends radially along at least a portion of a width of the interlayer.

4. The brake disk according to claim 1, wherein the at least one hole or recess is connected to a circumferentially inner edge or a circumferentially outer edge of the interlayer.

5. The brake disk according to claim 1, wherein the at least one hole or recess is spherical, cube-shaped, or cuboid-shaped.

6. The brake disk according to claim 1, wherein the at least one hole has a cross section that is elliptical or almond-shaped or drop-shaped or rectangular.

7. The brake disk according to claim 1, comprising at least two holes or recesses that are arranged out-of-plane with regard to each other, as considered in a plane that is orthogonal to the axial direction.

8. The brake disk according to claim 1, wherein the interlayer is connected to a hub of the brake disk or wherein one of the first friction ring and the second friction ring is connected to the hub of the brake disk.

9. The brake disk according to claim 1, wherein the interlayer and the first friction ring and the second friction ring are formed by separate parts that have been joined together, and/or wherein the interlayer is made from a material with a higher elasticity and/or lower brittleness than the first friction ring and the second friction ring.

10. The brake disk according to claim 1, wherein the interlayer comprises or consists of steel and/or grey cast iron and/or aluminum.

11. The brake disk according to claim 1, wherein the first friction ring and the second friction ring comprise or consist of grey cast iron and/or ceramics.

12. The brake disk according to claim 1, wherein the interlayer is configured to be compressed by at most 0.25 mm or at most 0.2 mm or at most 0.15 mm or at most 0.1 mm.

13. The brake disk according to claim 1, wherein the interlayer is configured to be compressed by at least 0.1 mm or at least 0.15 mm or at least 0.2 mm at a brake pressure of 70 bars.

* * * * *